(12) United States Patent
Long et al.

(10) Patent No.: US 11,628,949 B2
(45) Date of Patent: Apr. 18, 2023

(54) MODULAR POWER UNITS FOR AIRCRAFT

(71) Applicant: Rolls-Royce North American Technologies Inc., Indianapolis, IN (US)

(72) Inventors: Stephen Long, Carmel, IN (US); Dwayne Bevis, Bloomington, IN (US); Sean Guitar, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1094 days.

(21) Appl. No.: 16/280,554

(22) Filed: Feb. 20, 2019

(65) Prior Publication Data
US 2020/0262579 A1    Aug. 20, 2020

(51) Int. Cl.
  *B64D 41/00*     (2006.01)
  *H02B 1/48*      (2006.01)
  *H02B 1/20*      (2006.01)

(52) U.S. Cl.
  CPC ............... *B64D 41/00* (2013.01); *H02B 1/20* (2013.01); *H02B 1/48* (2013.01); *B64D 2041/005* (2013.01); *B64D 2221/00* (2013.01)

(58) Field of Classification Search
  CPC ............. B64D 41/00; B64D 2041/005; B64D 2221/00
  See application file for complete search history.

(56) References Cited

U.S. PATENT DOCUMENTS

| 7,799,477 | B2 | 9/2010 | Metzler et al. |
| 8,657,227 | B1 | 2/2014 | Bayliss |
| 9,445,665 | B2 * | 9/2016 | Huang ................... A47B 31/02 |
| 9,567,060 | B2 | 2/2017 | Woodland |
| 9,819,179 | B2 | 11/2017 | Nakagawa et al. |

(Continued)

FOREIGN PATENT DOCUMENTS

| WO | WO-2013136279 A2 * | 9/2013 | ............ B64D 11/00 |
| WO | WO-2014016708 A2 * | 1/2014 | ............ B64D 37/02 |
| WO | WO-2015060487 A1 * | 4/2015 | ............ B64D 27/24 |

OTHER PUBLICATIONS

Lambert, F., "Tesla is working on a new mobile battery-swap technology to deploy out of a trailer", Sep. 15, 2017, 12pgs. https://electrek.co/2017/09/15/tesla-new-battery-swap-technology-to-deploy-trailer/.

(Continued)

*Primary Examiner* — Timothy D Collins
*Assistant Examiner* — Justin Michael Heston
(74) *Attorney, Agent, or Firm* — Shumaker & Sieffert, P.A.

(57) ABSTRACT

Systems and methods are disclosed for providing flexible, scalable, and controllable electrical power to an aircraft. In some embodiments, a modular power unit comprises a container containing a power generation unit, a control system, a conditioning system, and an environmental control system. The power generation unit produces a generated power. The control system provides control signals to the power generation unit and controls at least one parameter of the generated power. The conditioning system receives and conditions the generated power and provides an output power to the power bus of the aircraft. The environmental control system provides a temperature regulating fluid to the power generation unit.

13 Claims, 5 Drawing Sheets

(56) References Cited

U.S. PATENT DOCUMENTS

| | | | |
|---|---|---|---|
| 2004/0028966 A1* | 2/2004 | Hibbs | H01M 8/04097 |
| | | | 429/454 |
| 2010/0233552 A1* | 9/2010 | Knepple | B64D 11/04 |
| | | | 429/513 |
| 2010/0292877 A1 | 11/2010 | Lee | |
| 2012/0318914 A1* | 12/2012 | Rajashekara | H02J 9/066 |
| | | | 244/58 |
| 2017/0018792 A1* | 1/2017 | Buelte | H01M 8/1007 |
| 2017/0327219 A1* | 11/2017 | Alber | B64C 29/02 |

OTHER PUBLICATIONS

Pipistrel Aircraft, "WATTsUP, the new 2-seat electric trainer", Dec. 2018, 2pgs. https://www.pipistrel.si/news/wattsup-the-new-2seat-electric-trainer-took-its-maiden-fligh.

* cited by examiner

MODULAR POWER UNITS FOR AIRCRAFT

BACKGROUND

Modern aircraft are typically powered by one or more gas turbine engines. The engine not only provides thrust to move the aircraft through the air, but also drives electrical generators to provide electrical power to the aircraft. However, efforts to achieve greater aircraft system efficiencies, reduce atmospheric carbon emissions, and reduce aircraft noise have led to interest in the use of hybrid electric and turbo-electric aircraft propulsion systems to replace the gas turbine engine.

Advances in battery and fuel cell technology have improved the feasibility of using such chemical power generation devices to power aircraft via hybrid electric and turbo-electric systems. Electric systems are more efficient than gas turbine engines, offer opportunities for increased propulsion-airframe integration to achieve aerodynamic efficiencies, and potentially avoid the price volatility associated with aviation fuels. The implementation of electric systems to power aircraft will require improvements to aircraft architecture, aircraft system design, and the infrastructure supporting the modern aviation industry.

SUMMARY

According to some aspects of the present disclosure, a modular power unit for an aircraft is disclosed. The aircraft has a power bus and a data bus. The modular power unit comprises a container, a data connection, and a power connection. The container is dimensioned to be received in a cargo hold of the aircraft. The container contains a power generation unit, a control system, a conditioning system, and an environmental control system. The power generation unit produced a generated power. The power generation unit may comprise a chemical power generation device. The control system provides control signals to the power generation unit, the control signals controlling at least one parameter of the generated power of the power generation unit. The conditioning system receives and conditions the generated power of the power generation unit. The environmental control system provides a temperature regulating fluid to at least the power generation unit and the conditioning system. The data connection connects the control system of the container to the data bus of the aircraft. The power connection connects the conditioning system to the power bus of the aircraft. The conditioning system provides a power output to the power bus.

In some embodiments the container is dimensioned as a standardized unit load device. In some embodiments the cargo hold is configured to receive one or more containers dimensioned as a standardized unit load device. In some embodiments the chemical power generation device is one of a battery or a fuel cell. In some embodiments the container further contains a safety system in communication with the control system. In some embodiments the safety system is a fire detection and suppression system.

In some embodiments the conditioning system conditions the generated power to produce a power output by adjusting one or more of voltage, amperage, frequency, and phase. In some embodiments the at least one parameter of the generated power is one or more of voltage, amperage, frequency, and phase. In some embodiments the temperature regulating fluid is one or more of oil, fuel, water, air, and a propylene-glycol mixture.

According to additional aspects of the present disclosure, a system is disclosed for supplying electrical power. The system comprises an aircraft having a power bus and a data bus, a plurality of modular power units, one or more data connections, and one or more power connections. Each modular power unit comprises a container that contains a power generation unit, a control system, a conditioning system, and an environmental control system. The power generation unit produces a generated power. The control system provides control signals to the power generation unit, the control signals controlling at least one parameter of the generated power of the power generation unit. The conditioning system receives and conditions the generated power of the power generation unit. The environmental control system provides a temperature regulating fluid to at least the power generation unit and the conditioning system. The one or more data connections connect the control system of each modular power unit to the data bus of the aircraft. The one or more power connections connect the conditioning system of each modular power unit to the power bus of the aircraft. The conditioning system of one or more modular power units provides a power output to the power bus.

In some embodiments the control system of a first modular power unit serves as master controller for each of the plurality of modular power units. In some embodiments the power generation unit comprises an energy storage device. In some embodiments the power generation unit comprises a chemical power generation device. In some embodiments the aircraft comprises a cargo hold, and wherein the container is dimensioned to be received in the cargo hold of the aircraft.

According to further aspects of the present disclosure, a method is disclosed for providing electrical power to an aircraft. The aircraft has a power bus and a data bus. The method comprises planning a multi-leg mission for the aircraft; determining an electrical power requirement for a first leg of the multi-leg mission; loading one or more modular power units onto the aircraft in preparation for the first leg; completing the first leg of the multi-leg mission with at least a portion of the electrical power of the aircraft supplied by the one or more modular power units; determining an electrical power requirement for a second leg of the multi-leg mission; removing at least one modular power unit from the aircraft; loading one or more modular power units onto the aircraft in preparation for the second leg; and completing the second leg of the multi-leg mission with at least a portion of the electrical power of the aircraft supplied by the one or more modular power units. Each modular power unit is coupled to the power bus and data bus of the aircraft, and each modular power unit comprises a container containing: a power generation unit for producing a generated power; a control system for providing control signals to the power generation unit, the control signals controlling at least one parameter of the generated power of the power generation unit; a conditioning system for receiving and conditioning the generated power of the power generation unit to provide a power output to the power bus; and an environmental control system for providing a temperature regulating fluid to at least the power generation unit and the conditioning system.

In some embodiments the electrical power requirement is the total amount of electrical power required to propel the aircraft and energize aircraft systems. In some embodiments the electrical power requirement is the amount of electrical power beyond that produced by the propulsive engines of the aircraft.

In some embodiments the method further comprises determining an electrical power requirement for a third leg of the multi-leg mission; removing all modular power units from the aircraft; and completing the third leg.

In some embodiments more than one modular power units are loaded onto the aircraft for the first leg, and wherein a first of the modular power units serves as a master control to the other of the modular power units. In some embodiments at least one of the one or more modular power units loaded onto the aircraft for the first leg are removed from the aircraft and replaced with cargo for the second leg.

BRIEF DESCRIPTION OF THE DRAWINGS

The following will be apparent from elements of the figures, which are provided for illustrative purposes.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The implementation of electric aircraft propulsion systems requires an electrical power source that is flexible, scalable, and controllable. As electric demands in an aircraft continue to rise, an electric system must be able to meet that demand and continue to safely propel the aircraft. Further, an electrical aircraft propulsion system should not burden an aircraft with unnecessary or unused electrical components.

While permanently installed batteries in an aircraft may meet some of the requirements of an electric aircraft propulsion system, such batteries would require significant changes to the airframe of an aircraft and therefore require a significant investment for design, qualification, and certification. These batteries would further require substantial changes in airport infrastructure which are not yet available.

The present disclosure is therefore directed to systems and methods of providing a flexible, scalable, and controllable electric aircraft propulsion system. More specifically, the present disclosure is directed to modular power units for supplying electrical power to an aircraft. The modular power units are removable from the aircraft and replaceable. The modular power units may be disposed in a container, and the container may conform to dimensional standards for aircraft cargo. The modular power units may contain all support systems required for successful provision of electric power to an aircraft, such as control, power conditioning, environmental regulation, and safety systems. The modular power units may integrate to the aircraft's power bus and control or data bus. The present disclosure is further directed to methods of implementing the modular power units in aircraft.

Figure 1:
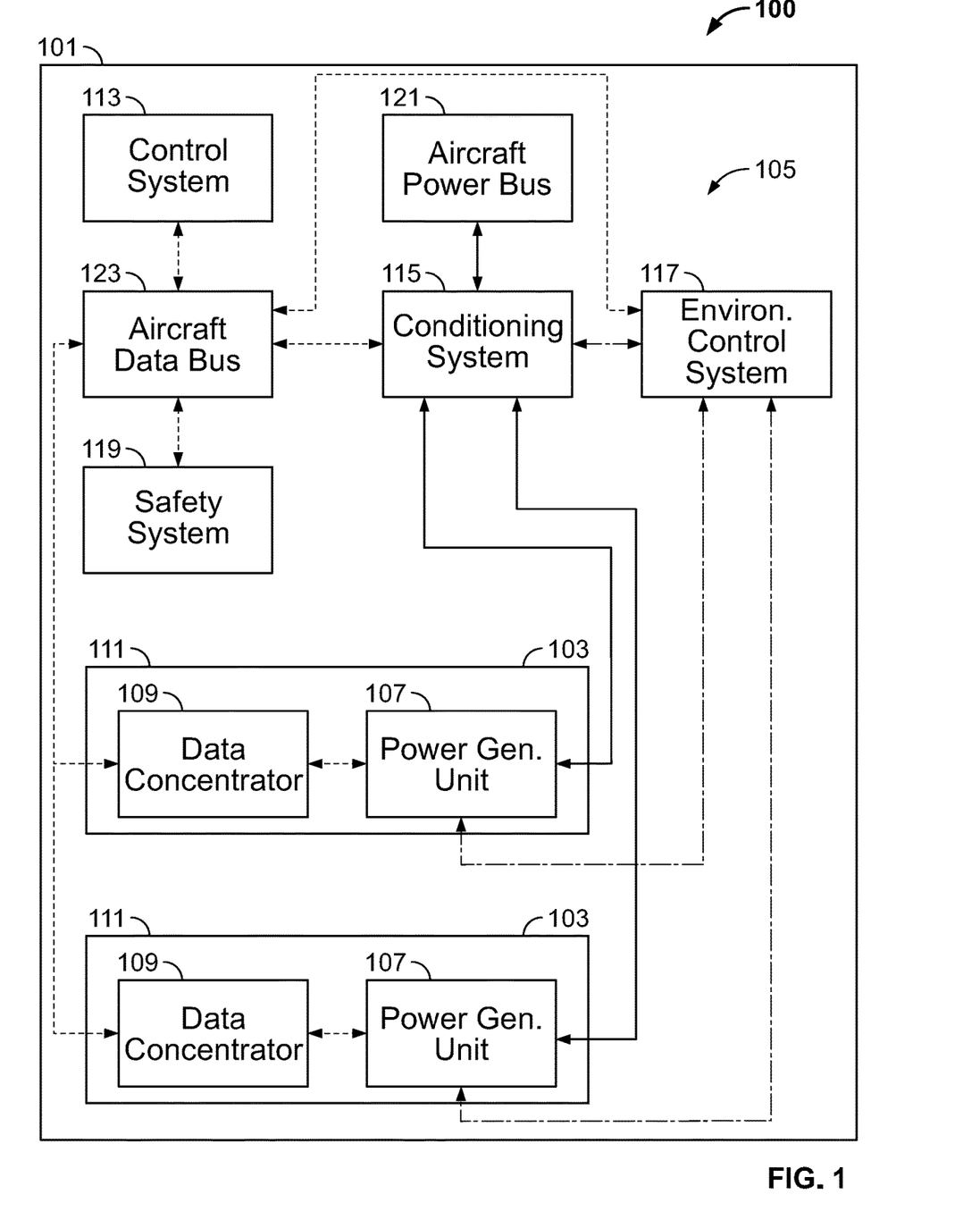
FIG. 1 is a schematic diagram of an aircraft electrical system in accordance with some embodiments of the present disclosure.

FIG. 1 presents a schematic diagram of a system 100 for providing electrical power to an aircraft 101. In the illustrated embodiment, the system 100 comprises one or more modular power units 103 and support systems 105. The modular power units 103 and support systems 105 are disposed within the aircraft 101. The aircraft 101 may have a power bus 121 and a control or data bus 123. In some embodiments the system 100 further comprises the power bus 121 and data bus 123.

The aircraft 101 may have a cargo hold 126, and the cargo hold 126 may be configured to receive one or more containers of a standardized unit load device (ULD). The containers received in the cargo hold 126 may contain cargo, or, as described further below, modular power units 103, 303.

In the illustrated embodiment, a pair of modular power units 103 are disposed within the aircraft 101. Each modular power unit 103 comprises a power generation unit 107 and a data concentrator 109 or similar communication facilitator. The power generation unit 107 and data concentrator 109 are contained within a container 111.

The power generation unit 107 may be a chemical power generation device such as a battery or fuel cell. The power generation unit 107 may be any other known device for generating electrical power, including a turbine engine, nuclear reactor, or energy storage device. The power generation unit 107 produces a generated power.

Figure 2:
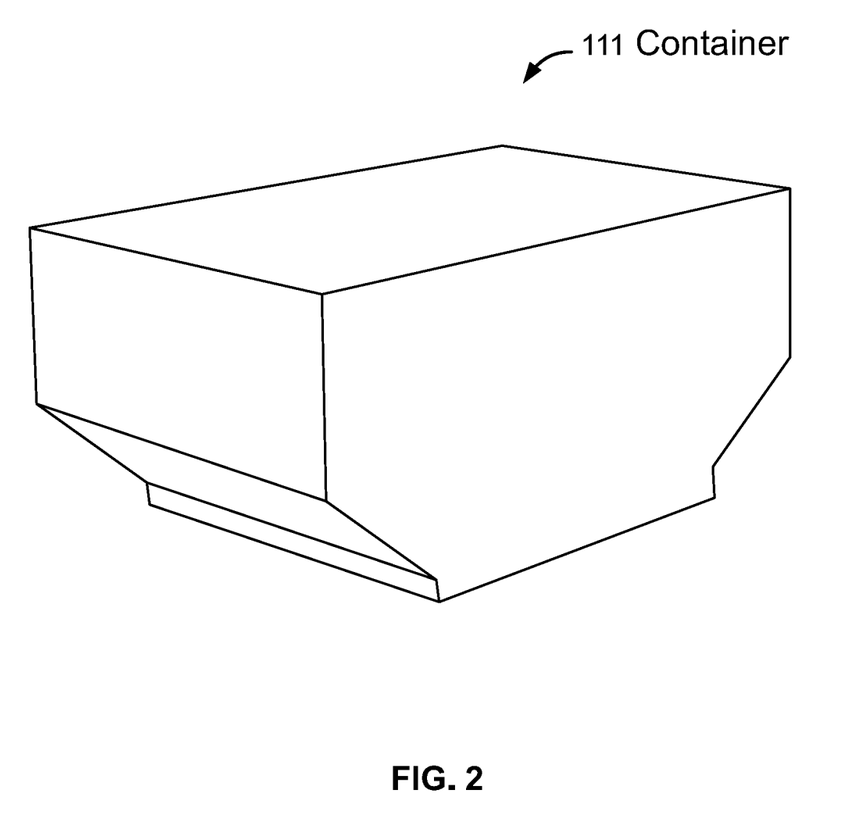
FIG. 2 is an isometric view of a container containing a power generation unit in accordance with some embodiments of the present disclosure.

The container 111 may be dimensioned according to a dimensional standard such as a standardized unit load device (ULD). The container 111 may be dimensioned as a derivative of a ULD, or may have custom dimensions. In embodiments having a container 111 dimensioned to a ULD, the container 111 may appear as shown in the isometric view of FIG. 2.

Support systems 105 may include a control system 113, a conditioning system 115, an environmental control system 117, and a safety system 119. In the system 100 of FIG. 1, the support systems 105 are located within the aircraft 101 but outside of the containers 111 of the modular power units 103.

Control system 113 may be in data communication with other components of system 100. Via control signals, the control system 113 may control various aspects of the operation of the system 100. For example, the control system 113 may send controlling signals to one or more power generation unit 107 to control or modify one or more parameters of the generated power of that power generation unit 107. Control system 113 may communicate with other components of the system 100 via aircraft data bus 123.

Data provided from the control system 113 to the aircraft data bus 123 may be sent to internal aircraft control systems or may be sent to external controllers. Data sent from the aircraft data bus 123 may be further processed and may provide indications to controllers, such as aircraft personnel or automated controllers.

Conditioning system 115 is electrically coupled between each power generation unit 107 and the aircraft power bus 121. The conditioning system 115 receives a generated power from one or more power generation units 107. The conditioning system 115 may condition the generated power to produce a power output that is acceptable to be provided to the aircraft power bus 121. The conditioning system 115 may adjust one or more parameter of the generated power to produce a power output. For example, the conditioning system 115 may adjust one or more of the voltage, amperage, frequency, and phase of the generated power to produce a power output that is acceptable to be provided onto the aircraft power bus 121.

Environmental control system 117 may provide a temperature regulating fluid to aide with temperature control of components of system 100. For example, environmental control system 117 may provide a temperature regulating fluid to each power generation unit 107 and to the conditioning system 115. The environmental control system 117 may control the temperature, pressure, and/or flow rate of the temperature regulating fluid in order to maintain a temperature of the component within a desired temperature band. The environmental control system 117 may comprise one or more heat exchangers to add or remove heat from the temperature regulating fluid as needed. The temperature regulating fluid may be circulated between the environmental control system 117 in a liquid or a gas phase, and may comprise one or more of oil, fuel, water, air, and propylene-glycol mixtures. The temperature regulating fluid may be circulated through a closed circuit between the environmental control system 117 and the various components of the system 100. In other embodiments the environmental control system 117 may be in fluid communication with other systems of the aircraft Safety system 119 may monitor, report, and/or correct unsafe developments during performance of the modular power units 103. For example, the safety system 119 may comprise a smoke, gas, and/or heat detection device to monitor and report hazards such as development of smoke, gas, and heat in the modular power unit 103 or in the vicinity of the modular power unit 103. Hazards may be reported to the control system 113. The safety system 119 may be a fire detection and/or suppression system, such that detection of a hazard such as high heat may trigger the safety system 119 to respond and correct the hazard where possible. The safety system 119 may be configured to take corrective actions in response to a detected hazard such as electrically isolating the power generation unit 107 from the aircraft power bus 121, suppressing heat or flames, heat management, and anti-propagation. The safety system 119 may comprise overcurrent and/or overvoltage protection hardware and/or software. In system 100 with safety system 119 disposed outside of the container 111 of the modular power unit 103, the safety system 119 may communicate into the modular power unit 103 via an aperture or similar opening in the container 111 in order to monitor conditions of the modular power unit 103 and take any corrective actions necessary.

The flow of electrical power is illustrated in FIG. 1 by solid lines between schematic components. Electrical power is able to flow between the power generation unit 107 of each modular power unit 103 and the conditioning system 115. Each power generation unit 107 may produce a generated power that is sent to the conditioning system 115. Once conditioned by the conditioning system 115, the generated power is converted to a power output. The power output flows from the conditioning system 115 to the aircraft power bus 121. From the aircraft power bus 121, the power output may be used meet the aircraft's electrical demands, including the demands of hybrid electric or turbo-electric propulsion systems. Electrical power may flow from the power generation unit 107 to the conditioning system 115 and on to the aircraft power bus 121, and may also flow in the reverse direction (from the aircraft power bus 121 through the conditioning system 115 to the power generation unit 107). For example, reverse flow may be used in embodiments having a battery as the power generation unit 107 in order to charge the battery.

The flow of data communications are illustrated in FIG. 1 by dashed lines. Data communications are sent through the aircraft data bus 123 and monitored, coordinated, and/or controlled by the control system 113. The control system 113, via the aircraft data bus 123, may be in data communication with the conditioning system 115, environmental control system 117, and/or safety system 119. The control system 113 is additionally in data communication via the aircraft data bus 123 with each modular power unit 103, and more specifically with the data concentrator 109 of each modular power unit 103. The data concentrator 109 may monitor, report on, and control the performance of the power generation unit 107. The control system 113 may monitor and/or control the performance of the power generation unit 107. The control system 113 may control at least one parameter of the generated power of the power generation unit 107, such as voltage, amperage, frequency, and phase.

The flow of temperature regulating fluid is illustrated in FIG. 1 by a dashed-dotted line. The temperature regulating fluid, which may be one or more of oil, fuel, water, air, and a propylene-glycol mixture, may be circulated from the environmental control system 117 to other components of the system 100 to aid in maintaining environmental parameters such as temperature within a desired operating range. For example, in cold weather conditions the temperature regulating fluid may be used to heat components of the system 100, while in warm weather conditions the temperature regulating fluid may be used to cool components of the system 100. As shown in FIG. 1, in some embodiments the temperature regulating fluid is supplied from the environmental control system 117 to each power generation unit 107 and to the conditioning system 115.

The system 100 of FIG. 1 provides electrical power to an aircraft 101 in a manner that is flexible, scalable, and controllable. In particular, more or less modular power units 103 may be added or removed from the aircraft 101 to scale the provision of electrical power to meet the specific demands of the aircraft 101 and aircraft mission. Depleted modular power units 103 may be quickly and efficiently replaced by fully charged or fully fueled modular power units 103 to refuel the aircraft electrical system without time-consuming recharging of the modular power units 103 while installed in the aircraft 101.

Figure 3:
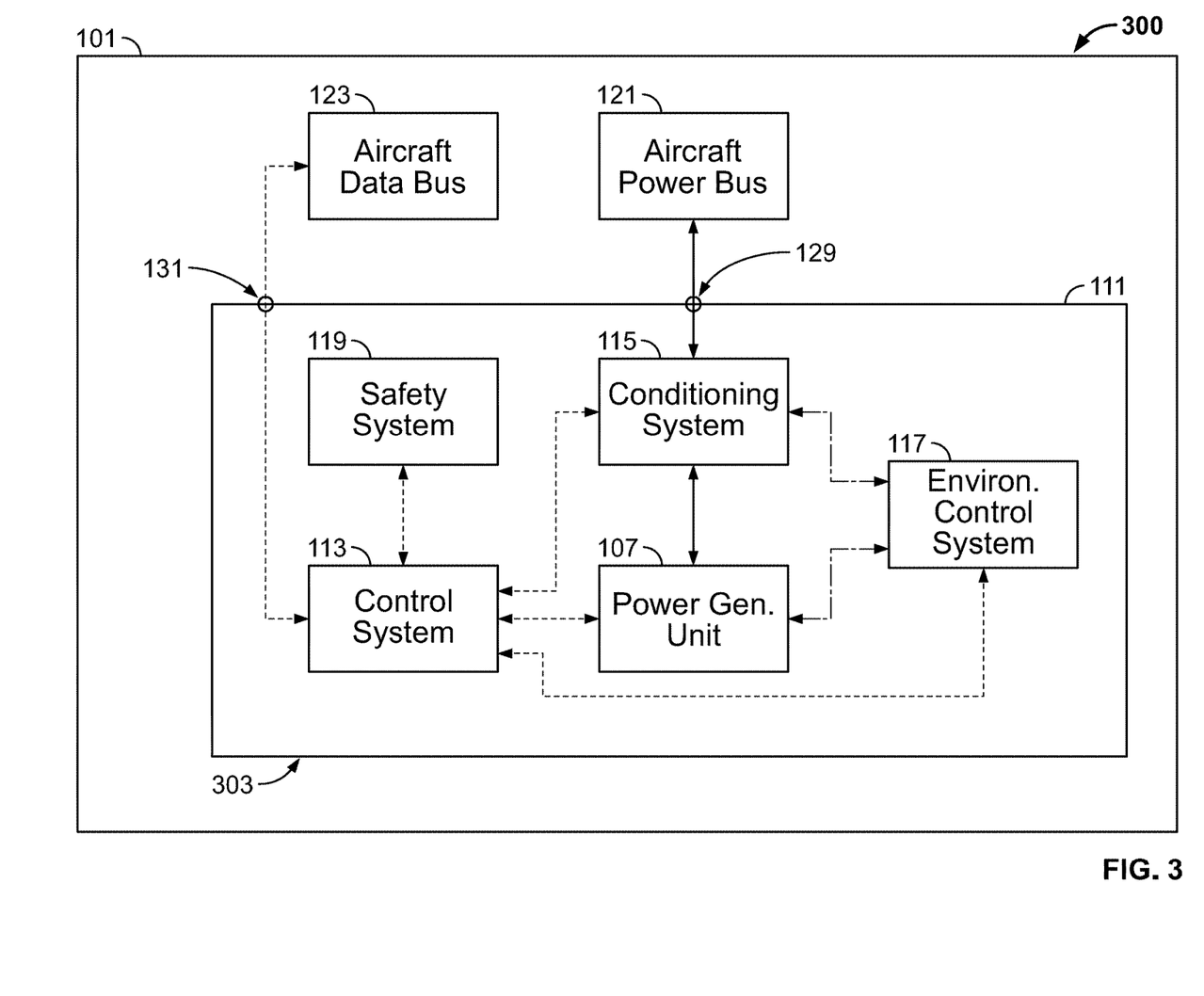
FIG. 3 is a schematic diagram of an aircraft electrical system in accordance with some embodiments of the present disclosure.

FIG. 3 provides a schematic diagram of another system 300 for providing electrical power to an aircraft 101. The system 300 of FIG. 3 differs from system 100 in that all support systems 105 of system 300 are included in modular power units 303. Thus the system 300 may be advantageous in that support systems 105 are flexible, scalable, and controllable. In other words, support systems 105 are not permanently installed on the aircraft 101, such that the aircraft 101 is not burdened with such systems when they are not in use with modular power units 303.

System 300 comprises one or more modular power units 303. System 300 may further comprise the aircraft power bus 121 and aircraft data bus 123.

A modular power unit 303 comprises a container 111 containing a power generation unit 107. The modular power unit 303 may further comprise a control system 113, a safety system 119, a conditioning system 115, and/or an environmental control system 117, which may each by disposed within the container 111. These systems are substantially as described above with reference to FIG. 1.

The modular power unit 303 may be coupled to and/or integrated with the aircraft systems. For example, a power connection 129 facilitates electrically connecting the modular power unit 303 with the aircraft power bus 121. Similarly, a data connection 131 facilitates a data connection between the modular power unit 303 and the aircraft data bus 123. Installation of a modular power unit 303 in an aircraft 101 may include positioning the modular power unit 303 securely within a cargo hold of the aircraft 101 and coupling the modular power unit 303, via the power connection 129 and data connection 131, to the aircraft power bus 121 and data bus 123.

The flow of electrical power is illustrated in FIG. 3 by solid lines between schematic components. Electrical power may flow between the power generation unit 107 and the conditioning system 115. Each power generation unit 107 may produce a generated power that is sent to the conditioning system 115. Once conditioned by the conditioning system 115, the generated power is converted to a power output. The power output flows from the conditioning system 115 to the aircraft power bus 121. From the aircraft power bus 121, the power output may be used meet the aircraft's electrical demands, including the demands of hybrid electric or turbo-electric propulsion systems. Electrical power may flow from the power generation unit 107 to the conditioning system 115 and on to the aircraft power bus 121, and may also flow in the reverse direction (from the aircraft power bus 121 through the conditioning system 115 to the power generation unit 107). For example, reverse flow may be used in embodiments having a battery as the power generation unit 107 in order to charge the battery.

The flow of data communications are illustrated in FIG. 3 by dashed lines. The control system 113 may be in data communication with the conditioning system 115, environmental control system 117, and/or safety system 119. The control system 113 is additionally in data communication with the power generation unit 107 of the modular power unit 103. The control system 113 may monitor and/or control the performance of the power generation unit 107. The control system 113 may control at least one parameter of the generated power of the power generation unit 107, such as voltage, amperage, frequency, and phase. Data may be provided from the control system 113 to the aircraft data bus 123.

The flow of temperature regulating fluid is illustrated in FIG. 3 by a dashed-dotted line. The temperature regulating fluid, which may be one or more of oil, fuel, water, air, and a propylene-glycol mixture, may be circulated from the environmental control system 117 to other components of the modular power unit 303 to aid in maintaining environmental parameters such as temperature within a desired operating range. For example, in cold weather conditions the temperature regulating fluid may be used to heat components of the modular power unit 303, while in warm weather conditions the temperature regulating fluid may be used to cool components of the modular power unit 303. As shown in FIG. 3, in some embodiments the temperature regulating fluid is supplied from the environmental control system 117 to the power generation unit 107 and to the conditioning system 115 of the modular power unit 303.

The system 300 of FIG. 3 therefore provides a flexible, scalable, and controllable source of electrical power for an aircraft 101, while also ensuring that systems supporting the power source (i.e. control, conditioning, environmental control, and safety systems) are integrated into the modular power unit 303. For circumstances that call for independent electrical power sources, the modular power units 303 can be loaded to the cargo hold and coupled to the aircraft power bus 121 in a quantity to meet the aircraft needs. For circumstances where an aircraft 101 does not require independent electrical power sources, the modular power units 303 may be decoupled from the power bus 121 and removed from the cargo hold. The aircraft 101 is therefore spared the weight of the modular power units 303, and the support systems that are incorporated into the modular power units 303. The power bus 121 and data bus 123 of the aircraft 101 maintain their position within the aircraft 101 and availability regardless of the configuration of modular power units 303 and/or cargo.

Figure 4:
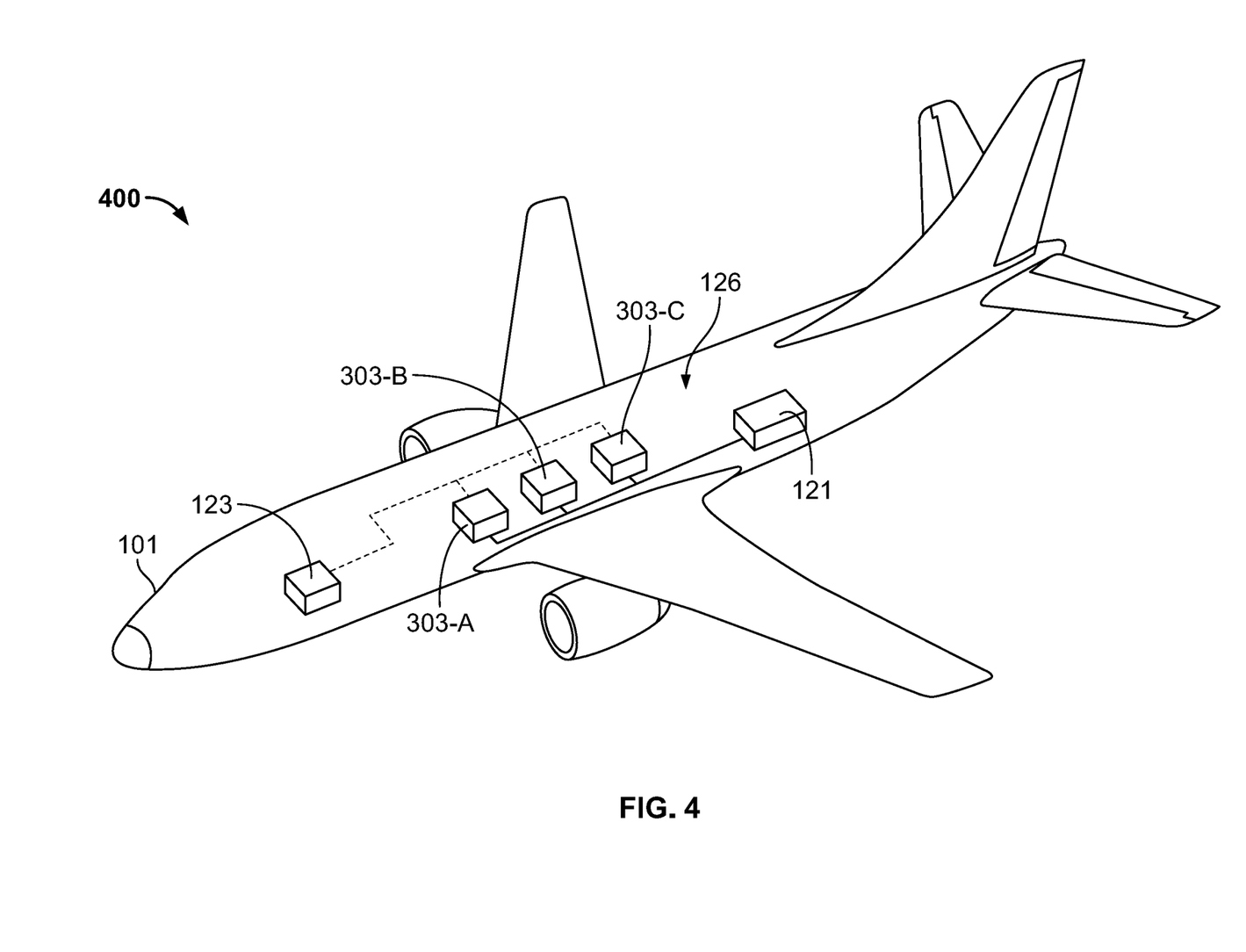
FIG. 4 is a diagram of an aircraft having an electrical system in accordance with some embodiments of the present disclosure.

FIG. 4 provides a schematic diagram of an aircraft 101 having a system 400 for providing electrical power to the aircraft 101. The diagram of FIG. 4 presents an embodiment of system 400 as contemplated by the present disclosure. System 400 comprises a plurality of modular power units 303-A, 303-B, and 303-C each coupled to the aircraft data bus 123 and aircraft power bus 121. As described above with reference to FIG. 3, the modular power units 303-A, 303-B, and 303-C each comprise a power generation unit 107 and support systems such as a control system 113, conditioning system 115, environmental control system 117, and safety system 119. In the illustrated embodiment the modular power units 303-A, 303-B, and 303-C are connected in parallel; in other embodiments, they may be connected in series.

In some embodiments the control system 113 of a first modular power unit 303-A may control additional modular power units such as 303-B and 303-C. For example, a control system of a first modular power unit 303-A may be designated as the master controller for all of the modular power units 303-A, 303-B, and 303-C of system 400.

Although the term power generation unit 107 is used in the illustrated embodiments to refer to a chemical power generation device such as a battery or fuel cell, the term is not so limited. In other embodiments, the power generation unit 107 may be any power generation device including, but not limited to, a mechanical power generation device (such as a rotating or reciprocating engine), a fuel cell, a solar cell, and a nuclear reactor.

Figure 5:
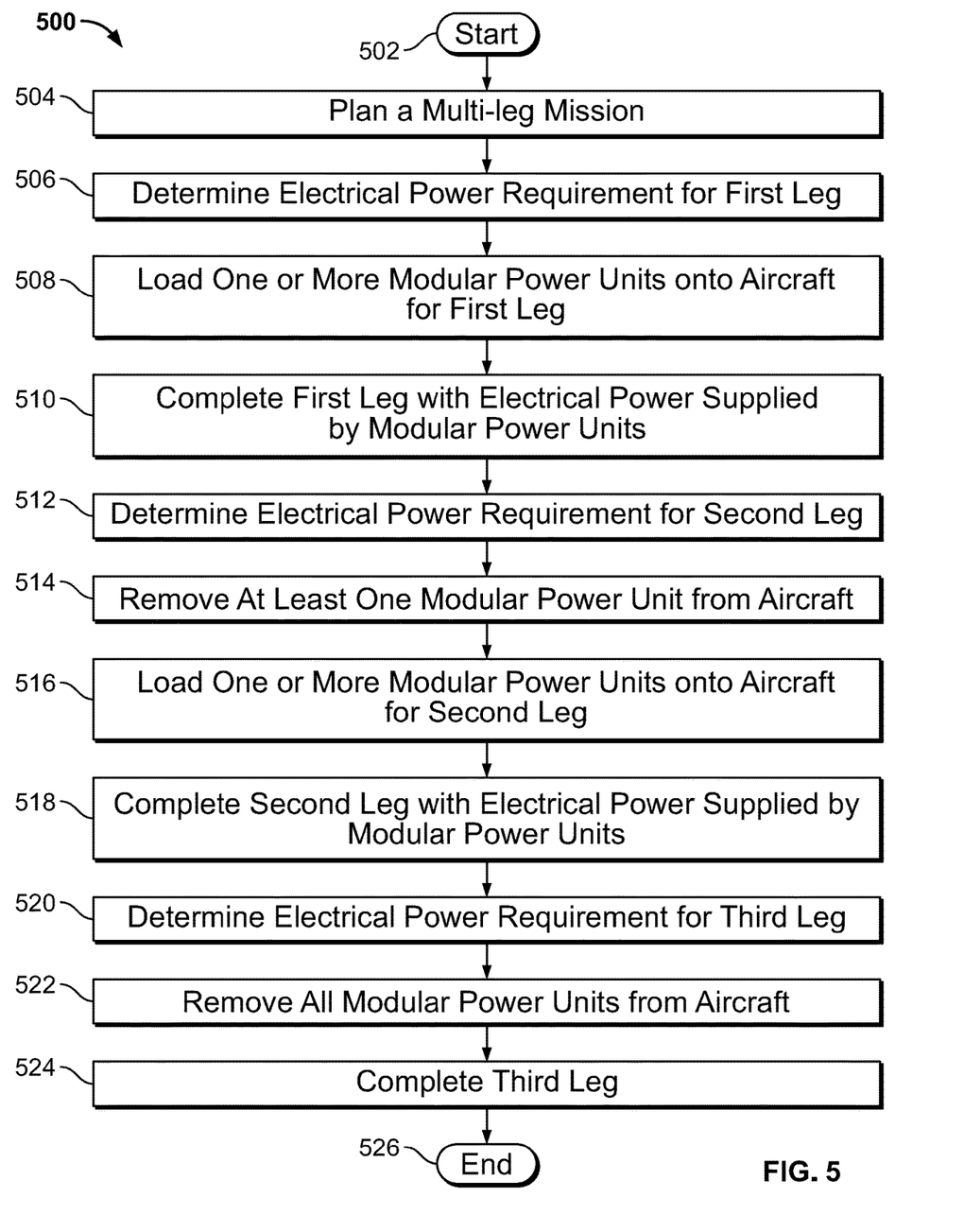
FIG. 5 is a flow diagram of a method in accordance with some embodiments of the present disclosure.

The present disclosure additionally provides methods of providing electrical power to an aircraft 101. The aircraft 101 may have a cargo hold 126, power bus 121, and data bus 123. FIG. 5 presents a flow chart of one such method 500. Method 500 starts at Block 502. The steps of method 500, presented at Blocks 502 through 526, may be performed in the order presented in FIG. 5 or in another order. One or more steps of the method 500 may not be performed.

At Block 504, a multi-leg mission is planned for the aircraft 101. The multi-leg mission may comprise, for example, flying the aircraft 101 from a first location such as an airport to a second location (first leg) and then returning to the first location (second leg). The multi-leg mission may comprise flying the aircraft 101 from a first location to a second location (first leg) and then on to a third location (second leg). The multi-leg mission may have an unlimited number of legs. The aircraft 101 may perform numerous other tasks during the multi-leg mission, including delivery or pick up of cargo at one or more locations.

At Block 506 the electrical power requirements of the aircraft 101 for the first leg are determined. The electrical power requirement for a given leg of the multi-leg mission may be determined as the total amount of electrical power required to propel the aircraft 101 and energize all aircraft systems during the leg. In other embodiments, the electrical power requirement may be the amount of electrical power needed beyond that produced by the propulsive engines of the aircraft 101.

At Block 508 one or more modular power units 303 are loaded onto the aircraft 101 for the first leg. The modular power units 303 may each comprise a container 111 containing a power generation unit 107, a control system 113, a conditioning system 115, and an environmental control system 117. The container 111 may be dimensioned to a dimensional standard such as a standardized unit load device. Each modular power unit 303 may be coupled to the aircraft data bus 123 and/or power bus 121. The number of modular power units 303 loaded on or onboard the aircraft 101 for the first leg may be between zero and ten. If more than one modular power units 303 are loaded on the aircraft 101, a control system 113 of a first modular power unit 303 may serve as the master controller for each additional modular power unit 303.

The first leg of the multi-leg mission is completed at Block 510, with at least one of the modular power unit 303 providing electrical power to the aircraft 101 via the power bus 121. The one or more modular power unit 303 may provide at least a portion of the electrical power of the aircraft 101. Discharging power from the modular power units 303 onto the power bus 121 may deplete one or more of the modular power units 303.

At Block 512 an electrical power requirement is determined for the second leg of the multi-leg mission. Based on the electrical power requirement of the second leg, the cargo hold 126 of the aircraft 101 may be reconfigured to add or remove both cargo and modular power units 303. At Block 514, at least one of the modular power units 303 loaded on the aircraft 101 for the first leg is removed from the aircraft 101 prior to the second leg. The removed modular power unit 303 may be replaced with cargo or with a different modular power unit 303.

At Block 516, one or more modular power unit 303 are loaded onto the aircraft 101 for the second leg. Modular power units 303 onboard the aircraft 101 at the end of the first leg may be replaced on a one-for-one basis or may be removed without replacement. More modular power units 303 may be added for the second leg than were removed. The number of modular power units 303 loaded on or onboard the aircraft 101 for the second leg may be between zero and ten. Each modular power unit 303 onboard the aircraft 101 for the second leg may be coupled to the power bus 121 and/or data bus 123.

The second leg of the multi-leg mission is completed at Block 518, with at least one of the modular power unit 303 providing electrical power to the aircraft 101 via the power bus 121. Discharging power from the modular power units 303 onto the power bus 121 may deplete one or more of the modular power units 303.

At Block 520, an electrical power requirement is determined for a third leg of the multi-leg mission. Based on the electrical power requirement of the third leg, the cargo hold 126 of the aircraft 101 may be reconfigured to add or remove both cargo and modular power units 303. At Block 522, all modular power units 303 may be removed from the aircraft 101. At Block 524 the third leg of the multi-leg mission may be completed.

Method 500 ends at Block 526.

Although examples are illustrated and described herein, embodiments are nevertheless not limited to the details shown, since various modifications and structural changes may be made therein by those of ordinary skill within the scope and range of equivalents of the claims.

What is claimed is:

1. A modular power unit for an aircraft, the aircraft having a power bus and a data bus, the modular power unit comprising:
a container dimensioned as a standardized unit load device to be received in a cargo hold of the aircraft, the container containing:
a power generation unit for producing a generated power, the power generation unit comprising a chemical power generation device;
a control system for providing control signals to the power generation unit, the control signals controlling at least one parameter of the generated power of the power generation unit;
a conditioning system for receiving and conditioning the generated power of the power generation unit; and
an environmental control system for providing a temperature regulating fluid to at least the power generation unit and the conditioning system;
a data connection for connecting the control system of the container to the data bus of the aircraft; and
a power connection for connecting the conditioning system to the power bus of the aircraft, wherein the conditioning system provides a power output to the power bus, wherein the power output supplies propulsive electrical demands of the aircraft using a hybrid electric or turbo-electric propulsion system.

2. The modular power unit of claim 1 wherein the container is of a plurality of containers, each container of the plurality dimensioned as a standardized unit load device, configured to be received by a cargo hold.

3. The modular power unit of claim 1 wherein said chemical power generation device is one of a battery or a fuel cell.

4. The modular power unit of claim 1 wherein the container further contains a safety system in communication with the control system.

5. The modular power unit of claim 4 wherein the safety system is a fire detection and suppression system.

6. The modular power unit of claim 1 wherein the conditioning system conditions the generated power to produce a power output by adjusting one or more of voltage, amperage, frequency, and phase.

7. The modular power unit of claim 1 wherein the at least one parameter of the generated power is one or more of voltage, amperage, frequency, and phase.

8. The modular power unit of claim 1 wherein the temperature regulating fluid is one or more of oil, fuel, water, air, and a propylene-glycol mixture.

9. A system for supplying electrical power comprising:
an aircraft having a power bus and a data bus;
a plurality of modular power units, each modular power unit comprising a container dimensioned as a standardized unit load device, containing:
a power generation unit for producing a generated power;
a control system for providing control signals to the power generation unit, the control signals controlling at least one parameter of the generated power of the power generation unit;
a conditioning system for receiving and conditioning the generated power of the power generation unit; and an environmental control system for providing a temperature regulating fluid to at least the power generation unit and the conditioning system;

one or more data connections for connecting the control system of each modular power unit to the data bus of the aircraft; and one or more power connections for connecting the conditioning system of each modular power unit to the power bus of the aircraft;

wherein the conditioning system of one or more modular power units provides a power output to the power bus, wherein the power output meets propulsive electrical demands of the aircraft using a hybrid electric or turbo-electric propulsion system.

10. The system of claim 9 wherein the control system of a first modular power unit serves as master controller for each of the plurality of modular power units.

11. The system of claim 9 wherein the power generation unit comprises an energy storage device.

12. The system of claim 9 wherein the power generation unit comprises a chemical power generation device.

13. The system of claim 9 wherein the aircraft comprises a cargo hold, and wherein the container is dimensioned to be received in the cargo hold of the aircraft.

* * * * *